United States Patent [19]

Garwood et al.

[11] 4,050,407
[45] Sept. 27, 1977

[54] APPARATUS FOR FLUID BED COATING OF GLASS BOTTLES

[75] Inventors: George Garwood, Wynnewood, Pa.; Joseph C. Flynn, Millville, N.J.

[73] Assignee: Wheaton Industries, Millville, N.J.

[21] Appl. No.: 638,679

[22] Filed: Dec. 8, 1975

[51] Int. Cl.² ............................................. B05C 3/10
[52] U.S. Cl. ..................................... 118/58; 65/60 B; 118/425; 118/503; 118/DIG. 5; 214/1 BB; 294/87.26
[58] Field of Search ............... 118/500, 503, 423, 504, 118/425, 580, 505; 279/37, 117, 1 R; 214/1 BB, 1 BD; 294/87.26; 65/260, 60 B

[56] References Cited

U.S. PATENT DOCUMENTS

| | | | |
|---|---|---|---|
| 2,713,419 | 7/1955 | Hayes | 65/260 X |
| 2,824,029 | 2/1958 | Zinty | 118/530 X |
| 3,411,636 | 11/1968 | Wallis | 294/87.26 X |
| 3,615,327 | 10/1971 | McLary | 65/60 B |
| 3,734,765 | 5/1973 | Russell et al. | 118/503 X |
| 3,764,284 | 10/1973 | Rowe | 65/260 X |
| 3,765,712 | 10/1973 | Hardy et al. | 294/87.26 X |
| 3,856,498 | 12/1974 | Campagna et al. | 65/60 B |
| 3,884,184 | 5/1975 | Arrandale et al. | 118/503 X |
| 3,901,180 | 8/1975 | Allen et al. | 118/2 |
| 3,965,852 | 6/1976 | Hardy | 118/8 |

*Primary Examiner*—Morris Kaplan
*Attorney, Agent, or Firm*—Miller & Prestia

[57] ABSTRACT

Apparatus for applying thermoplastic coating to glass containers includes a plurality of chuck bars, from each of which a plurality of container holding chucks are suspended, each of the chucks consisting of a U-shaped member upon which a lip or projection on the container neck is supported and from which the container is suspended and a loosely fitting cap member which drops over the top of the container. The chuck bars are supported by end members adapted to be transferred along a transfer track, preferably including rollers to facilitate such transfer. Movable transfer track segments are provided, to transfer chuck bars at specific positions for container pick-up and container coating. To effect longitudinal transfer of the chuck bars, elongated pusher members are disposed parallel to the transfer tracks. The pusher members includes dogs for engaging and disengaging the end members of the plurality of chuck bars. Means are included for transferring chuck bars in separate sections of the apparatus different transfer distances to provide for different spacing between transfer stations.

37 Claims, 17 Drawing Figures

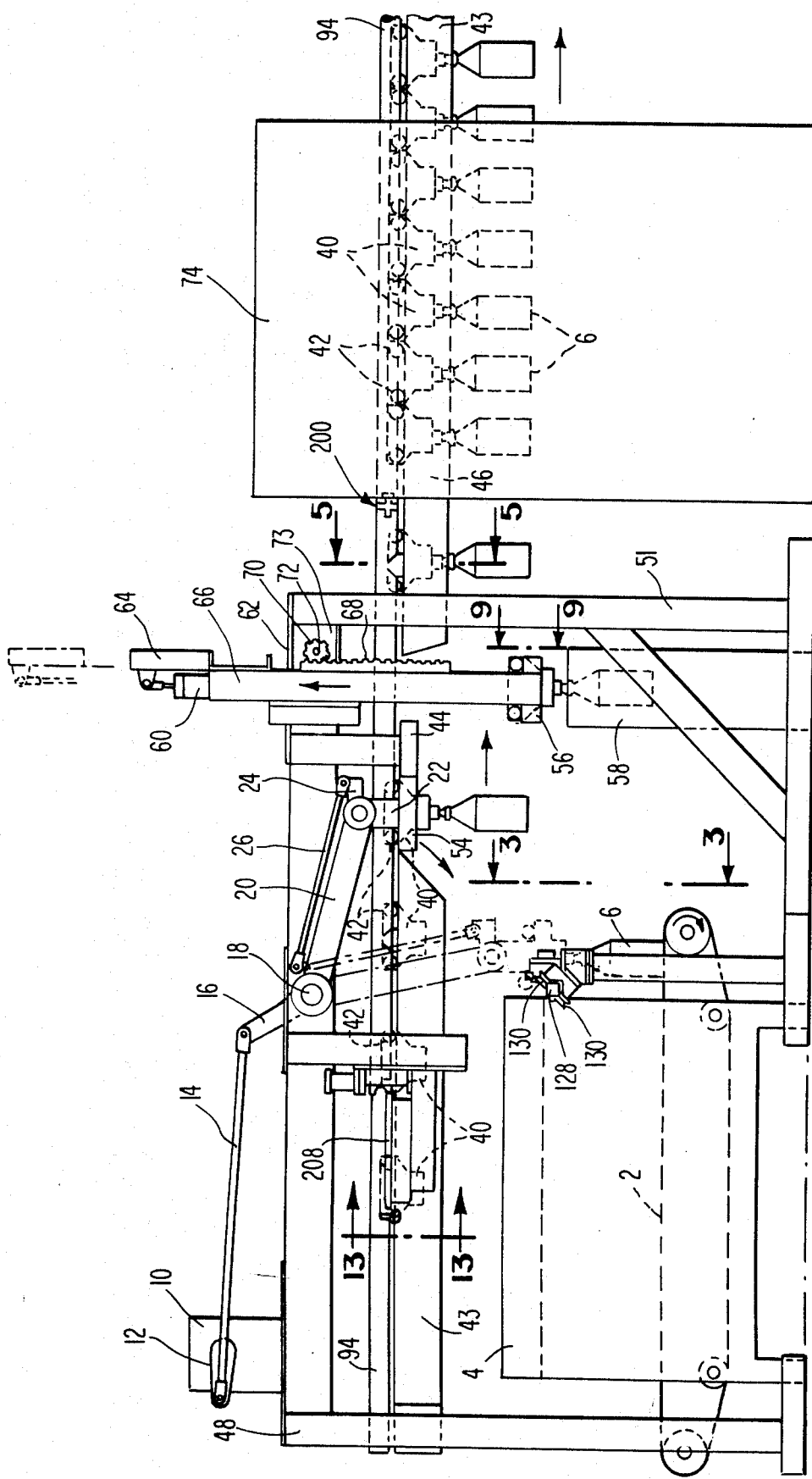

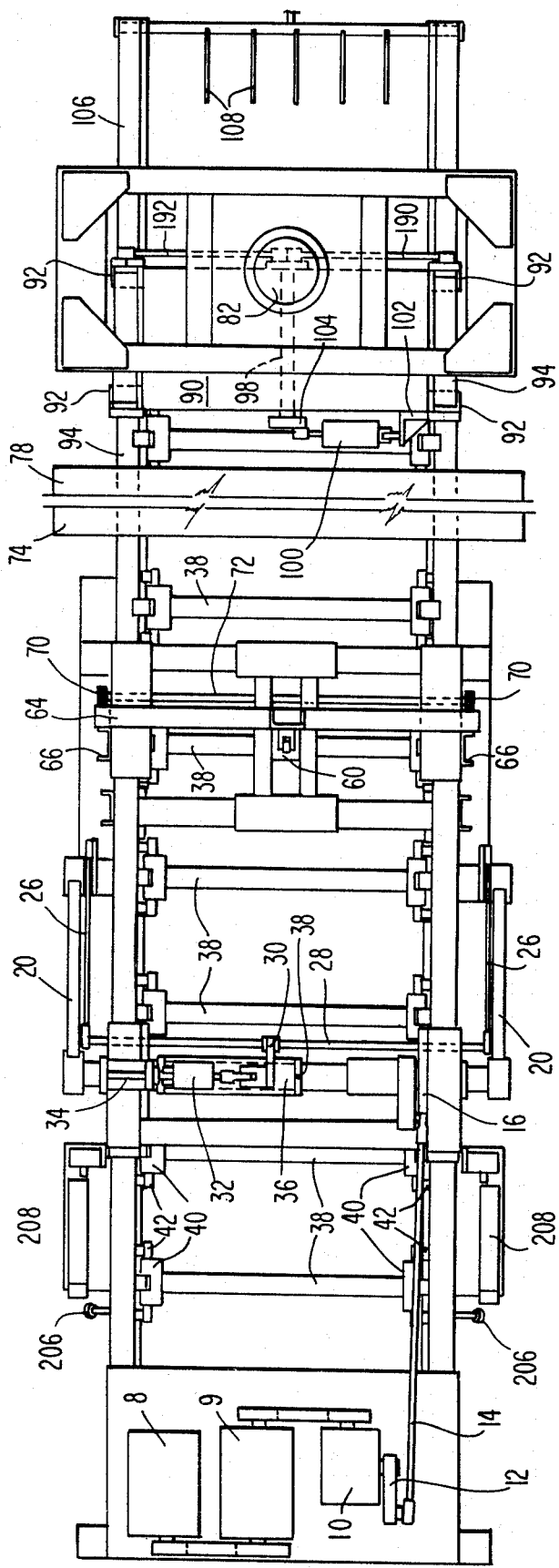
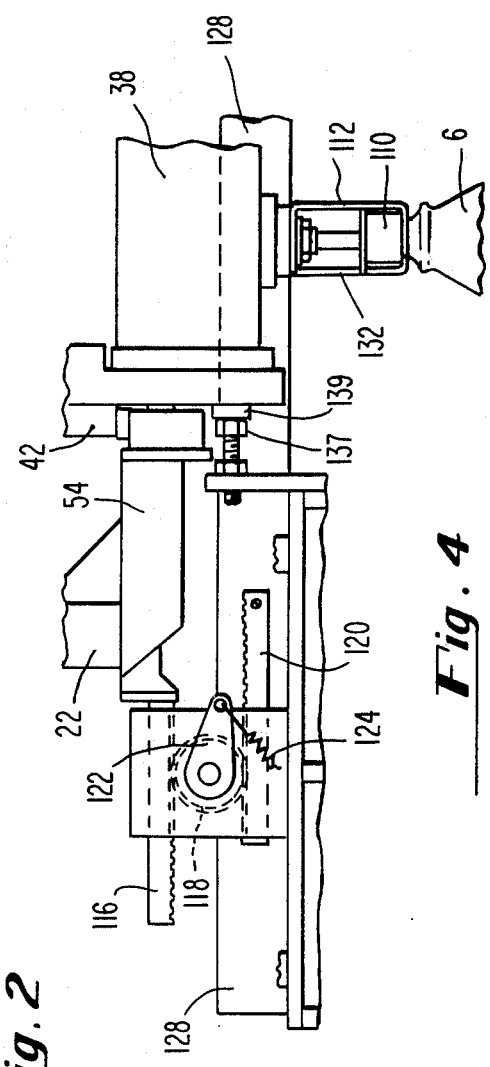
Fig. 2
Fig. 4

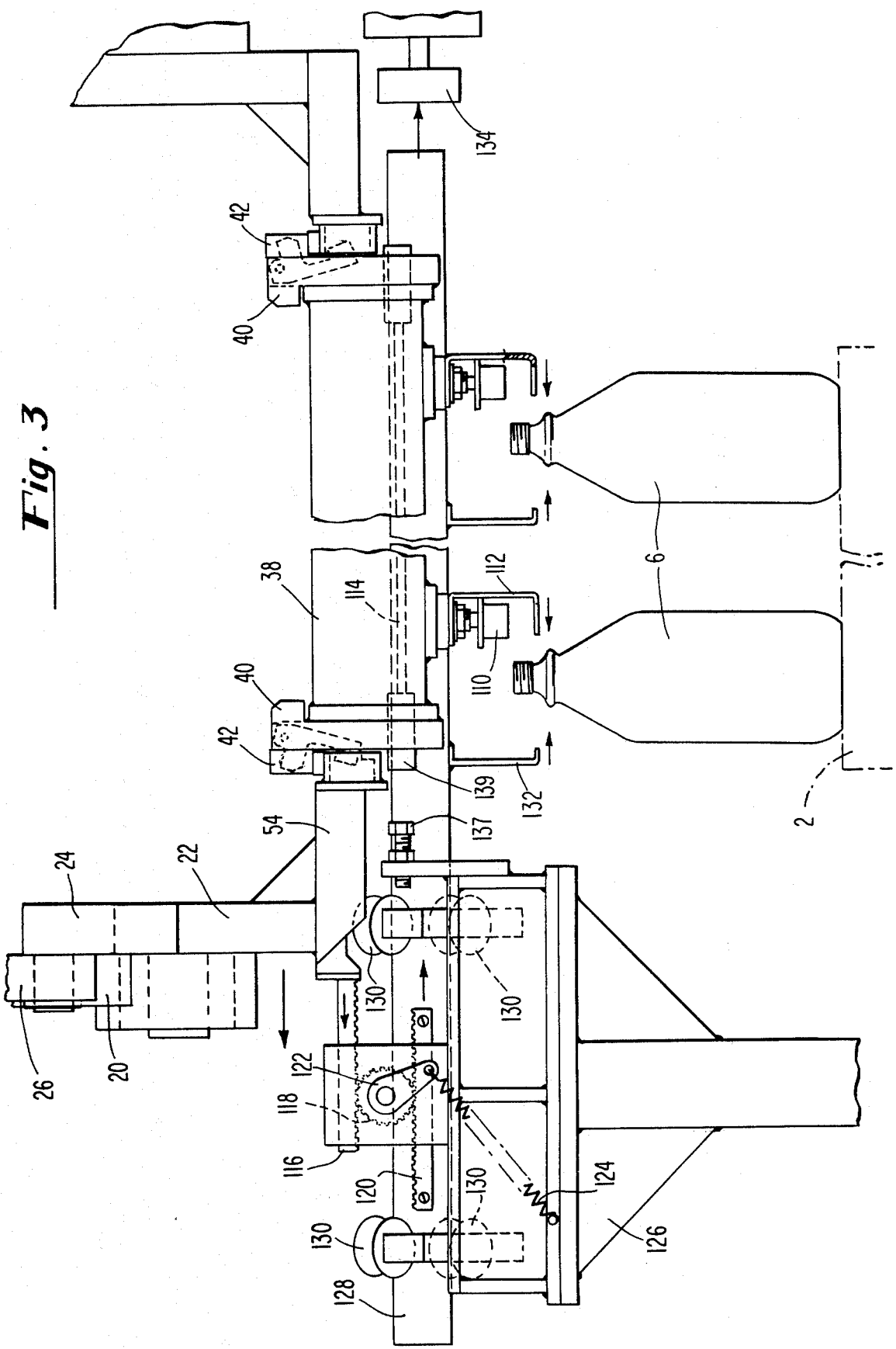

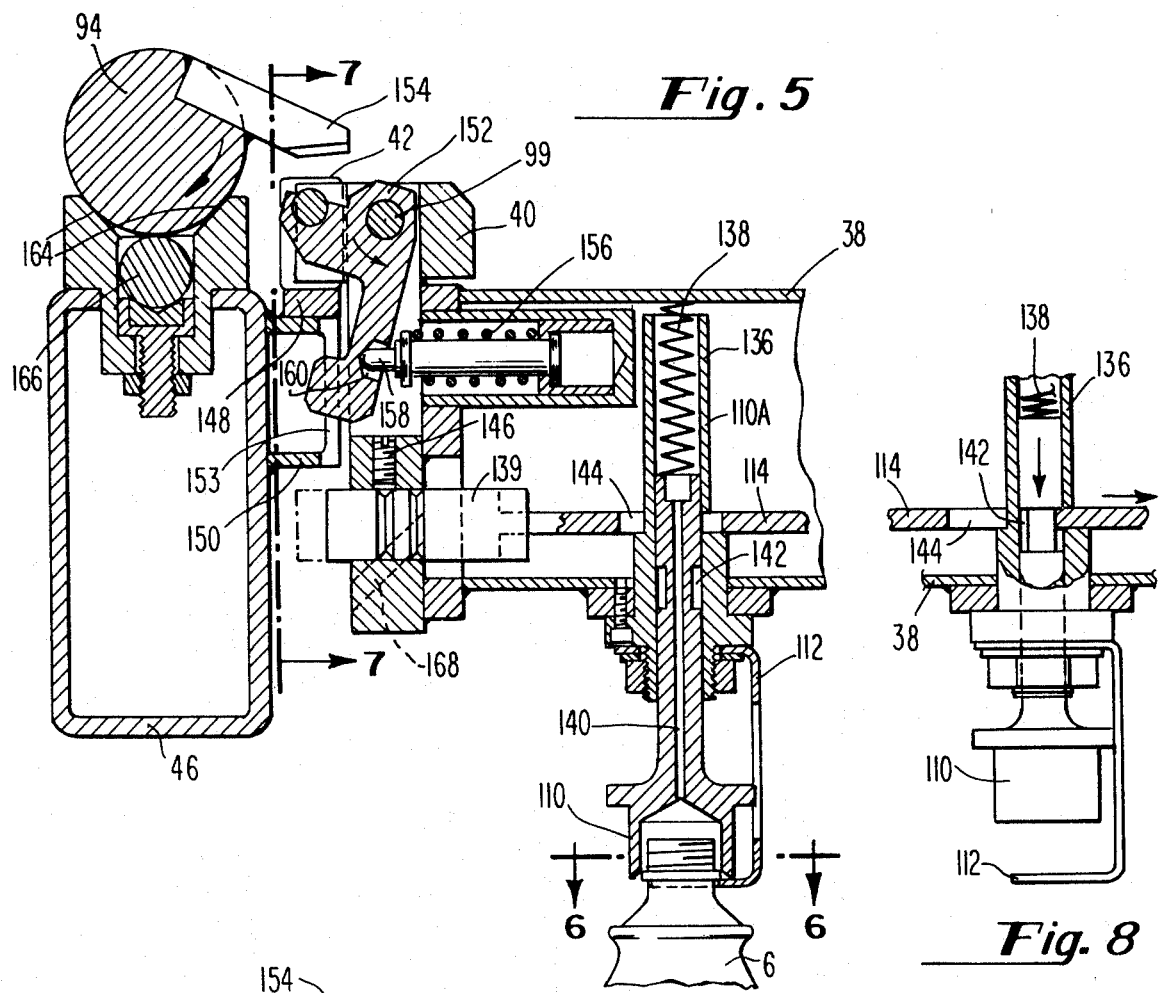
Fig. 5
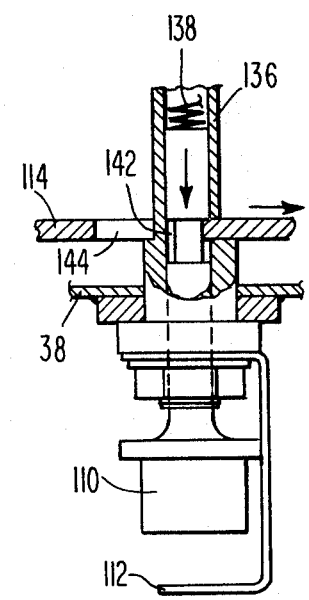
Fig. 8
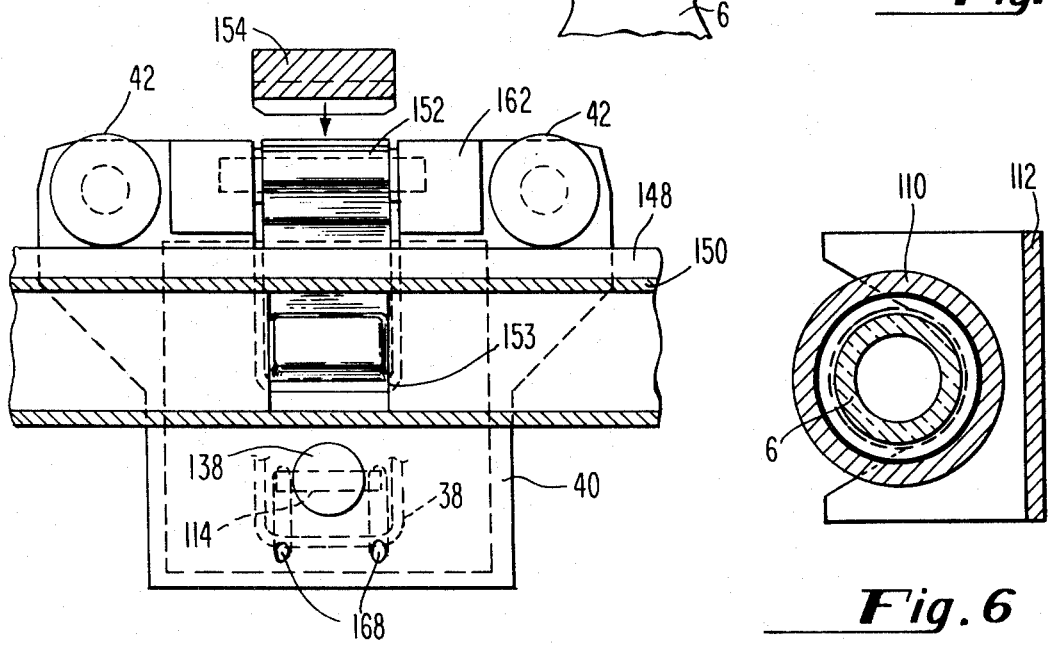
Fig. 7
Fig. 6

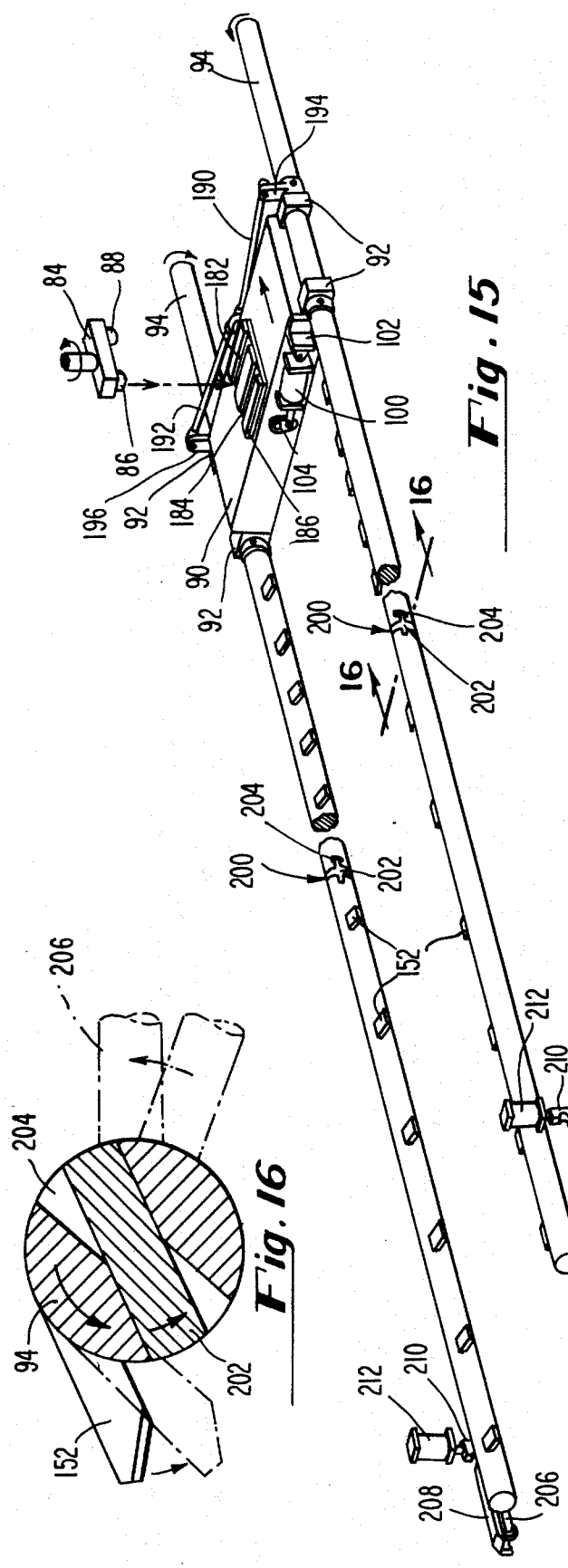
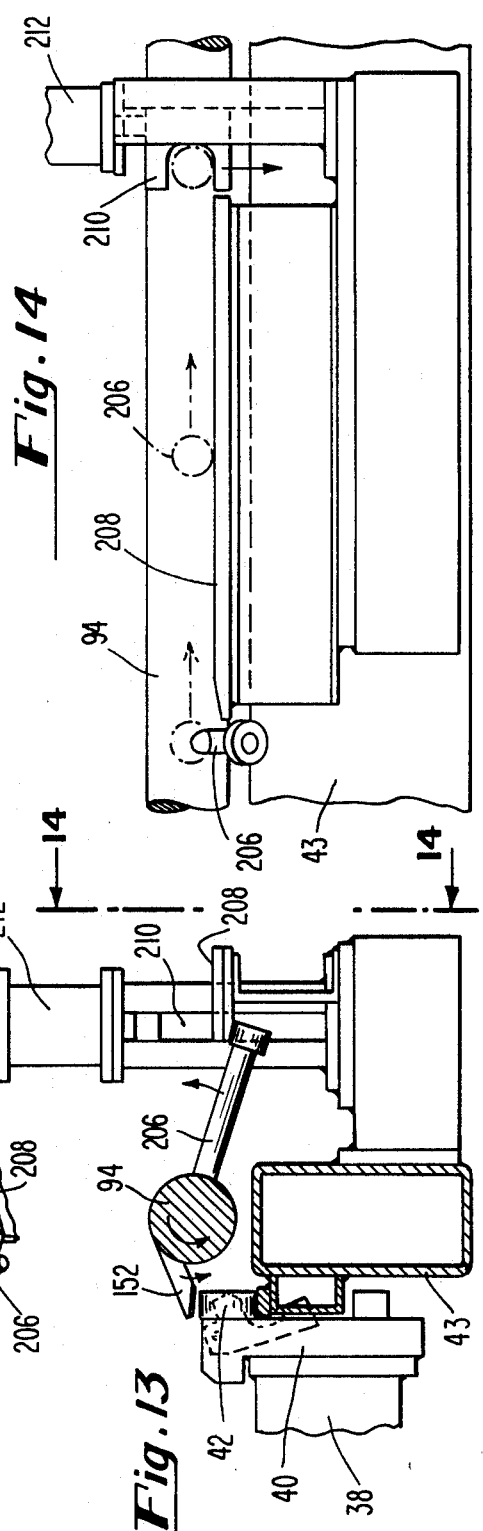
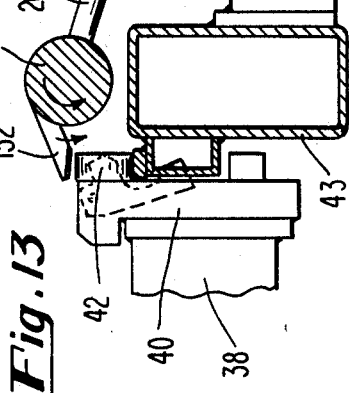

4,050,407

APPARATUS FOR FLUID BED COATING OF GLASS BOTTLES

This invention pertains to an apparatus for continuously applying a thermoplastic coating to glass bottles (or containers) and particularly to such apparatus adapted to coat such bottles in a continuous in-line manner as they are produced or decorated.

In recent years, there has been increasing interest in the application of plastic coatings to glass bottles, either to effect a change in surface appearance or feel of the glass bottles, or to limit the tendency of the glass bottles to shatter upon breaking. The latter objective has become more prominent with the increasing emphasis on product safety. Such plastic coatings have been applied by spraying, and particularly electrostatic spraying, and by immersion in a liquid coating material. Coating such bottles by first heating them or removing them from an annealing or decorating lehr while they are at an elevated temperature and then dipping the bottles into a fluidized bed of thermoplastic coating powder has also been suggested. See, for example, U.S. Pat. Nos. 3,856,498—Campagna et al and 3,901,180—Allen et al. (the latter of common assignment and of partial common inventorship herewith).

The Allen et al. patent is directed specifically to an apparatus for the continuous transfer and coating of hot bottles, in a fluid bed process, adapted particularly to coat such bottles removed at a pre-selected elevated temperature, for an annealing or decoration lehr.

Notwithstanding these prior art disclosures, there remained the need for a more efficient apparatus capable of producing a thin and very uniform, transparent coating on glass bottles.

It is the general objective of the present invention to provide such an apparatus and particularly to provide improved bottle holding and transfer means for use in such apparatus.

These objects are met by an apparatus for applying thermoplastic coating to glass bottles (including both narrow and wide mouth containers) which includes a plurality of chuck bars, from each of which a plurality of bottle holding chucks are suspended, each of the chucks consisting of a U-shaped member upon which a lip or projection on the bottle neck is supported and from which the bottle is suspended and a loosely fitting cap member which drops over the top of the bottle. The chuck bars are supported by end members adapted to be transferred along a transfer track, preferably including rollers to facilitate such transfer. Movable transfer track segments are provided, first to receive a chuck bar with chucks, prior to bottle pickup, which segment is moved downwardly to align the chucks with a plurality of bottles to be picked up, the lift assembly and chuck bar then being moved transversely, while neck backup members on a parallel bar are moved in an opposite direction to engage the containers. Opposite transverse movement of the chuck bar and pickup station removable track segment and simultaneously returning the removable track segment to the level of the remainder of the transfer track permits subsequent transfer of the containers to other work stations. A second movable track segment is provided where the containers are lowered with the movable track segment to immerse the containers in a fluidized bed of thermoplastic coating powder. Elongated pusher members disposed parallel to transfer tracks include dogs for engaging and disengaging the end members of the plurality of chuck bars, by reciprocal rotational movement of the elongated pusher members, and for transfer of the chuck bars by longitudinal movement of the pusher members, while the transfer dogs are engaged in the end members. Means are included for transferring chuck bars in separate sections of the apparatus different transfer distances to provide for different spacing between transfer stations.

Preferably, containers to be picked up in the chucks of the apparatus are passed through a thermal preconditioning oven to ensure maximum uniformity of temperature and thermal characteristics throughout the containers to be coated. Preferably also, thermal postconditioning chambers or spaces are provided to ensure optimum coating quality.

This invention may be better understood by reference to the following detailed description thereof, taken in conjunction with the subjoined claims, and the appended drawings in which:

DESCRIPTION OF DRAWINGS

FIGS. 1A and 1B together comprise a side elevation view of the in-line fluid bed bottle coating apparatus of the present invention;

FIG. 2 is a top view of the apparatus shown in FIGS. 1A and 1B;

FIG. 3 is an enlarged sectional view in the plane 3—3 of FIG. 1A of the apparatus shown in FIG. 1A;

FIG. 4 is an enlarged detail view of one part of the mechanism shown in FIG. 3, with certain elements thereof in an alternate position;

FIG. 5 is an enlarged sectional view in the plane 5—5 of FIG. 1A of one part of the apparatus shown in FIG. 1A;

FIG. 6 is a detail view in the plane 6—6 of FIG. 5, of one part of the mechanism shown therein;

FIG. 7 is a sectional view in the plane 7—7, of another part of the mechanism shown in FIG. 5;

FIG. 8 is a detail view of a part of the mechanism shown in FIG. 5 with certain of the elements thereof in an alternate position to that shown in FIG. 5;

FIG. 13 is a detail sectional view in the plane 13—13 of a part of the apparatus shown in FIG. 1A;

FIG. 14 is a detail side elevation view of the mechanism shown in FIG. 13;

FIG. 15 is a perspective assembly view of the chuck bar transport system in the apparatus shown in the previous figures; and FIG. 16 is a detailed cross-sectional view in the plane 16—16, of the mechanism shown in FIG. 15.

Figure 1B:
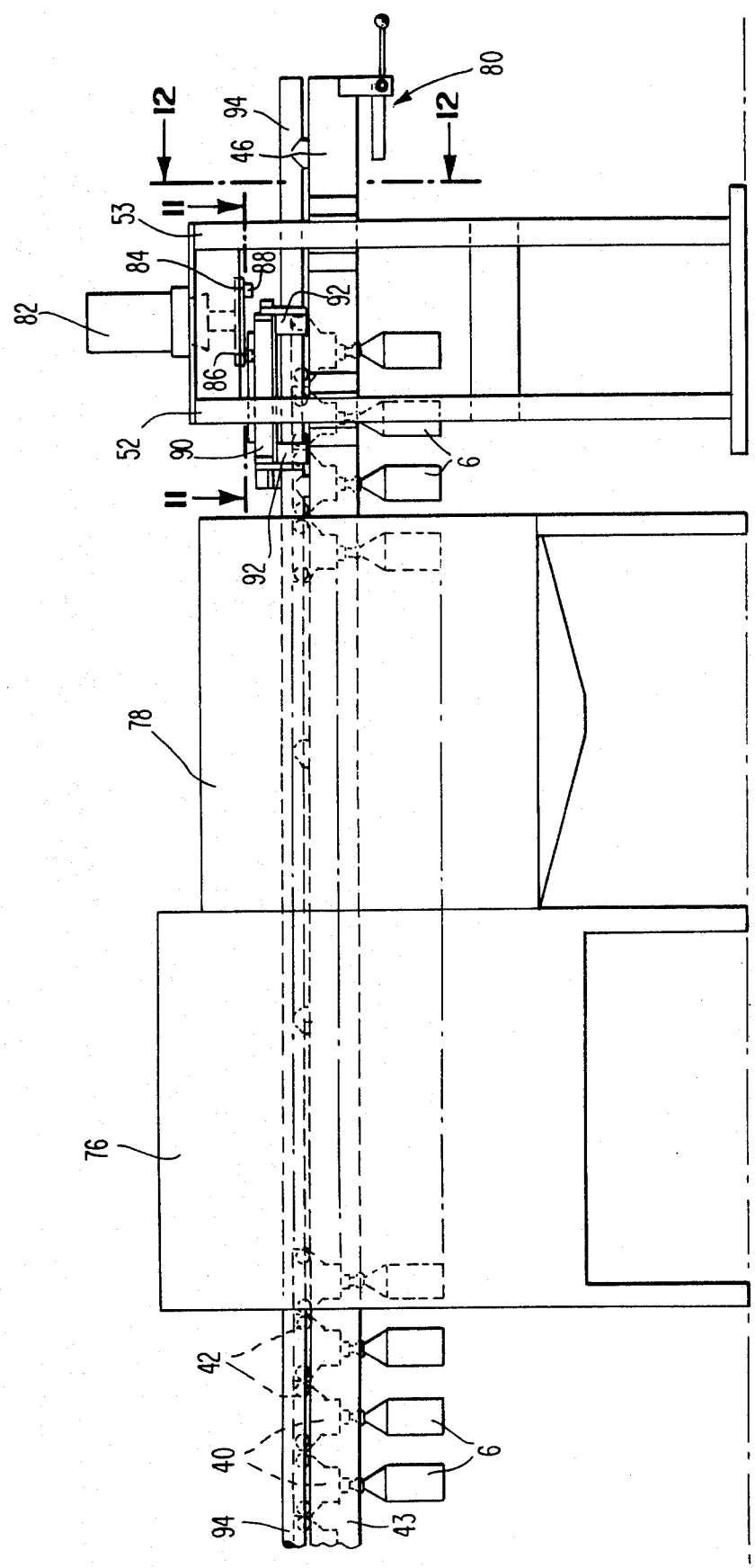

Referring more specifically to FIGS. 1A, 1B and 2, there is shown container containing delivery lehr 2 and temperature conditioning chamber 4 with container 6 at one end thereof.

Container 6, or more accurately, a plurality thereof as shown in FIG. 3, is removed from lehr 2 by the rotary motion of motor 8 transposed through clutch brake 9 and speed reducing gear box 10 to crank arm 12 pivotally attached through connecting member 14 to a second crank arm 16, in turn turning shaft 18 on which is mounted a pair of container lift arms 20.

At the end of each container lift arm 20, opposite that at which it is mounted on shaft 18, arm 20 is pivotally connected to a vertical hanger 22. At each end of each container lift arm 20, lift arm 20 is also pivotally attached to spacing members 24, in turn pivotally connected to the opposite ends of a parallelogram-forming member 26, in turn attached at its upper end to a second shaft 28 turned by third crank arm 30, which turns in unison with shaft 18.

The assembly of lift arms 20 and parallelogram-forming members 26, together with hangers 22 and other elements suspended therefrom, are adapted to be shifted transversely to the direction of general container movement in the machine, i.e., vertically downward in FIG. 2, by means of cylinder 32 fixedly mounted at one end to frame member 34 and at its other end to sliding bushing 36 with key 38 engaging a groove therefor in shaft 18.

After pick-up from the end of lehr 2, containers 6 are conveyed through the in-line fluid bed container coating apparatus of this invention from left to right, as seen in FIGS. 1A, 1B and 2, as they are suspended from one of a series of chuck bars 38 with end members 40 supported by rollers 42, which in turn rest on transfer rail segments 43, 44 and 46. Transfer rail segments 43, 44 and 46 are in turn supported from various static frame members, including members 48, 49, 50, 51, 52 and 53. Chuck bars 38 are supported in spaces at the discontinuities in transfer rail segments 43, 44 and 46 by pick-up station bar support 54 and dipping station bar support 56.

In FIG. 1A, the container lift arm 20 and its related assembly including hangers 22 and pick-up station bar support 54 are shown in a raised position, just prior to transfer of containers longitudinally along the machine. The same assembly is shown in phantom in its lower position ready for container pick-up.

Fluid bed coating is accomplished, in the apparatus of FIGS. 1A, 1B and 2, by dipping containers 6 in a tank 58, containing fluidized thermoplastic powder, while the containers are at an elevated temperature. Thermoplastic powder coming in contact with the hot container sidewalls fuses and forms a coating on these sidewalls.

Dipping of containers 6 into fluid bed coating tank 58 is effected by the action of piston 60, mounted at its lower end to a horizontal frame member 62 and its upper end to a cross-member 64 in turn mounted to a pair of vertically moveable bar suspension members 66, which are in turn attached to dipping station bar support 56. Also associated with the vertically moveable bar suspension members 68 are rack members 68 and a pair of anti-skew gears 70 mounted on a common shaft 72 extending across the machine and journalled in lengthwise side frame members 73.

To the right of fluid bed coating tank 58 containers pass in sequence through thermal soaking chamber 74, air cooling chamber 76, spray quenching chamber 78 and thence to container out station 80.

Near the right end of the apparatus shown in FIGS. 1A, 1B and 2, and as best seen in FIGS. 1B and 2, this apparatus includes motor 82, the shaft of which is connected to rotor 88 carrying cam followers 86 and 88 engaging longitudinal transfer plate 90, in turn attached to sleeves 92 for effecting longitudinal movement of transfer tubes 94. Limited rotational movement of transfer tubes 94 is effected by pivotally connected linking members 190, 192 in turn connected to shaft 98, to which limited intermittent rotary movement (in alternation directions) is imparted by piston 100, attached at one end to frame member 102 and at its opposite end to a circumferential position on crank arm 104 at the end of shaft 98. Frame extension 106 and guides 108 provide a receiving point for containers at take-out station 80 and a pick-up point for chuck bars 38, after the removal of containers 6 therefrom for the return of chuck bars 38 to the left end of the apparatus. In the machine shown, this is done manually. Mechanical means for performing these functions automatically, particularly including container release and take-out and return of bars 38 to the container pick-up station of the machine, would be included in a more preferred embodiment of this apparatus.

In FIGS. 3 and 4, the mechanism for picking up containers 6 from lehr 2 is shown in detail, before and after container engagement. More specifically, there is seen chuck bar 38 and, suspended therefrom, a plurality of chucks including chuck necks 110 and container neck supports 112.

Retainer bar 114 holds chuck necks 110 in a raised position prior to engagement of chucks and containers. At its left end, as seen in FIG. 3, pick-up station bar support 54 pushingly engages rack 116, which in turn engages gear 118 and second rack 120. Gear 118 is mounted on a shaft with crank arm 122 attached to follower spring 124, in turn attached to static frame member 126. Second rack 120 is fixedly secured to transversely slideable bar 128, which is supported by rollers 130. Suspended from transversely slideable bar 128 are a plurality of container neck backing members 132. Abutment 134 limits the rightward movement of bar 128, whiel adjustable abutment screw 137 positioned to push inwardly on end piece 139 of retainer bar 114 upon the coordinated leftward movement of chuck bar 38 and its associated assembly and retainer members and rightward movement of bar 128 and its associated members.

Following gripping of containers, as shown in FIG. 4, chuck bar 38 is lifted back to the level of transfer rail segments 43, 44 and 46 and transversely reversed to its starting lateral position.

The manner in which containers 6 are thus suspended is best seen in FIGS. 5–8. Specifically referring to FIG. 5, chuck neck 110 is seen to include an upward extension 110A slideable within chuck support 136 and urged downwardly by spring 138. Air passageway 140 extends downwardly through upward extension 110A of chuck neck 110. A reduced diameter section 142 on the outer surface of upward neck extension 110A is adapted to engage slot 144 in retainer bar 114. Thus, chuck neck 110 is suspended in its upward position, as shown in FIG. 8, with retainer bar 114 in its leftmost position. Rightward movement of retainer bar 114 permits chuck neck 110 to move downwardly over containers 6, as shown in FIG. 5. A retainer and spring 146 in chuck bar end member 40 tends to position retainer bar 114 positively in one of its two preselected positions as it engages slots provided for that purpose in retainer bar end piece 139.

Rollers 42 are actually seen to rest on a shelf member 148 in turn supported on an inwardly extending channel 150 attached to transfer rail segment 46. Openings 153 in channel 150 at each position or station for chuck bars 38 along the length of the machine are adapted to receive pivotally mounted locking members 152, held in locking engagement by spring means 156. More specifically, retainer 158 engaging retainer slot 160 urges pivotally mounted locking member 152 into a locking position within channel 150.

Clockwise movement of transfer tube 94, and engagement of dog 154 with pivotally mounted locking member 152, frees end member 40 and chuck bar 38 for longitudinal movement by the longitudinal engagement of dog 154 in slot 162 of end member 40, so that upon longitudinal movement of transfer tube 94, chuck bar 38 is moved longitudinally in engagement therewith. To permit such longitudinal movement of transfer tube 94, it is seated and rests for sliding movement within support shoulder members 164 and on roller bearing member 166 of transfer rail segment 46. Similar support, bearing, channel and shelf members are also associated with transfer rail segments 43 and 44.

To facilitate the passage of air downwardly through chuck neck 110 and over the upper portion of the neck of containers 6 as containers 6 are dipped into the fluidized thermoplastic powder in the bed contained in tank 58, end member 40 includes air passageways 168 communicating with the interior hollow space of chuck bar 38, such that pressurized air introduced through air passageways 168 finds an outlet downwardly through air passageways 140 and the upward extended section 110A of chuck neck 110.

Figure 9:
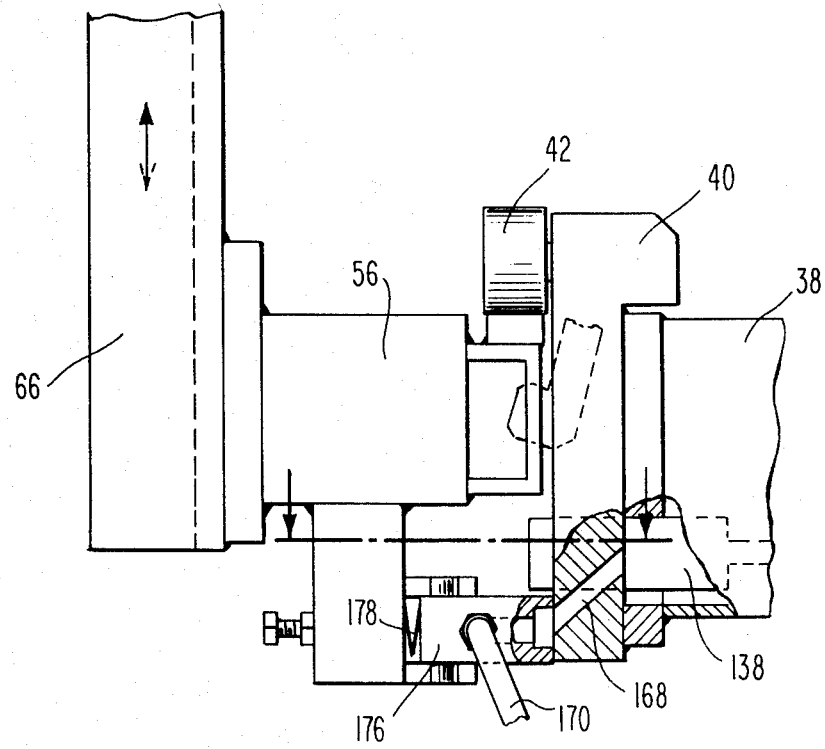
FIG. 9 is a detail sectional view of one part of the apparatus shown in FIG. 1A, taken in the plane 9—9 thereof.
Figure 10:
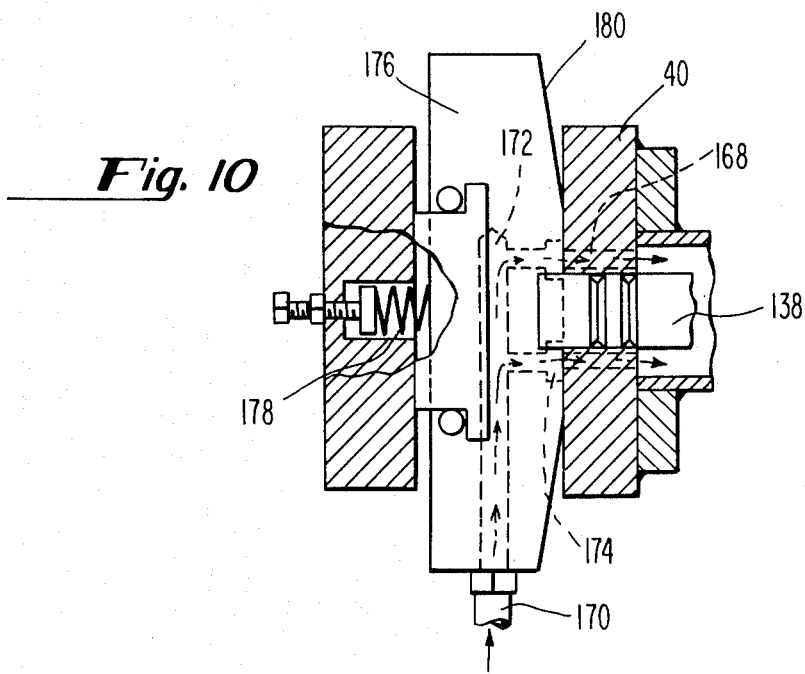
FIG. 10 is a detail sectional view in the plane 10—10 of the mechanism shown in FIG. 9.
Figure 11:
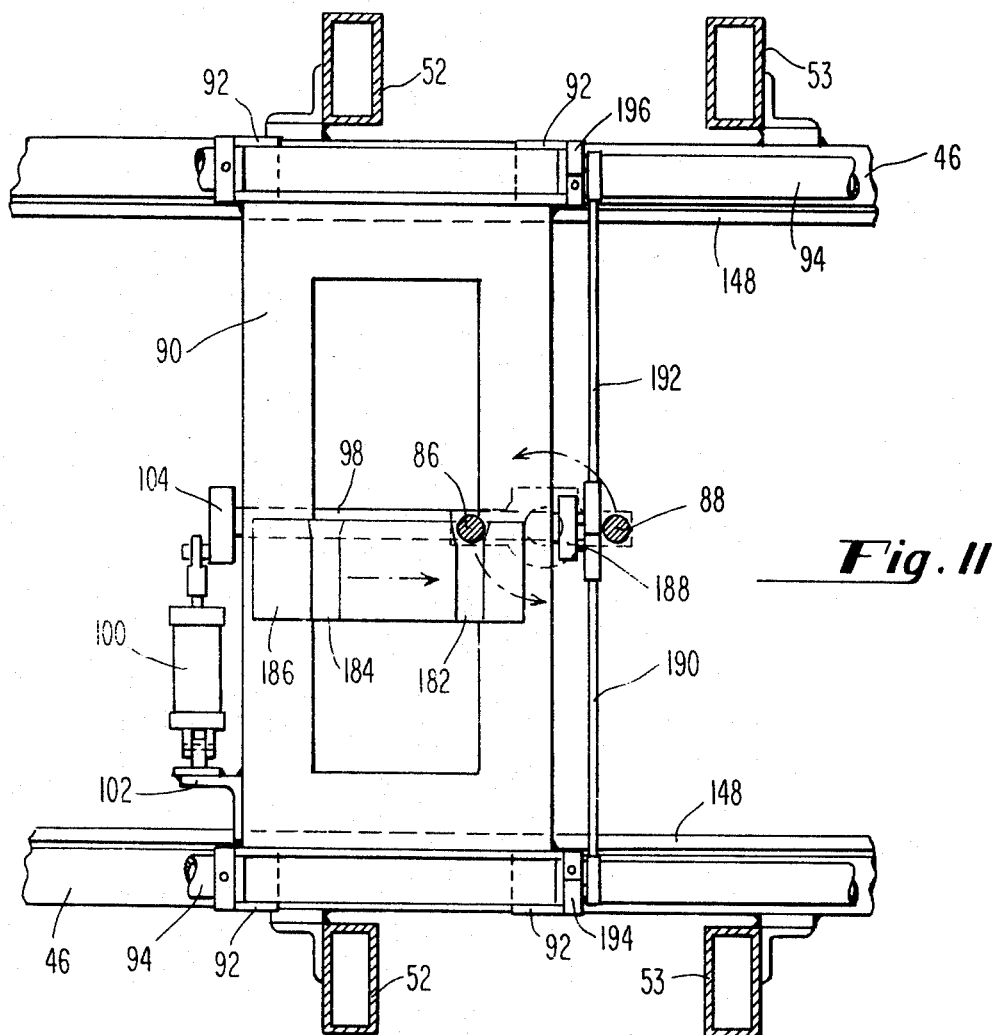
FIGS. 11 and 12 are detail views in the plane 11—11 and 12—12, respectively, of the apparatus shown in FIG. 1B.
Figure 12:
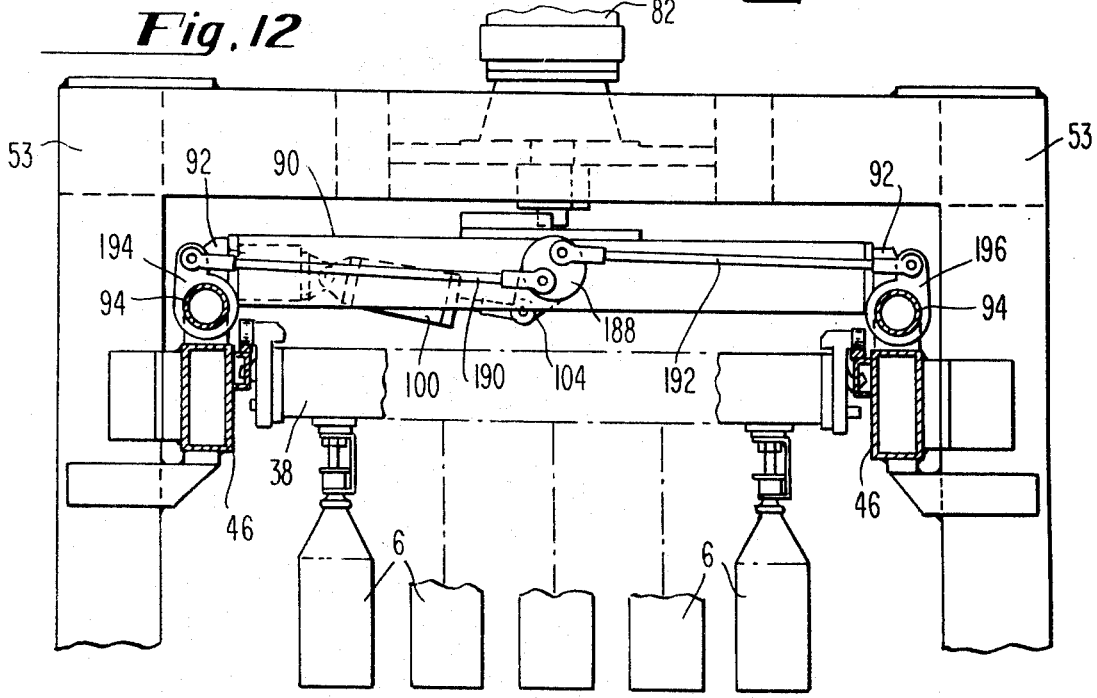

As seen in FIGS. 9 and 10, dipping station bar support 56 includes a connection 170 passing through an air passageway 172 to air outlets 174 in an air passageway engagement member 176 urged inwardly by spring means 178. Sloped surfaces 180 are provided on member 176 to facilitate mating engagement of air outlets 174 with the outer end of air passageways 168 in end member 40 of chuck bar 38.

In the operation of the in-line fluid bed container coating apparatus of this invention, containers picked up from lehr 2 are progressively transferred through a multiplicity of intermediate stations along the length of the machine before reaching take-out station 80. Prior to entering the first thermal conditioning chamber 74, these container stations are spaced a sufficient distance to permit certain operations necessary in the coating process; preferably this spacing is on the order of 16 inches. Stations thereafter in chambers 74 and 78 permit closer spacing of the containers; preferably, the space between stations in this part of the apparatus is on the order of 8 inches, or about half that of the first several stations.

The mechanism for effecting this transfer is illustrated in FIGS. 11-16. Referring more specifically to these figures, sleeves 92, within which transfer tubes 94 are free to rotate, effect longitudinal movement of transfer tubes 94 through the distance between the maximum spacing of container stations, namely 16 inches in the case of container station spacing in accordance with the preferred embodiment of the present invention. Sleeves 92 are in turn attached to longitudinal transfer plate 90 which is intermittently and reciprocatingly moved, in two stages in each direction, by the camming action of cam followers 86 and 88 in cam grooves 182 and 184 on grooved member 186 associated with longitudinal transfer plate 90.

Each of the cam followers 86 and 88 effect longitudinal movement of transfer plate 90 and transfer tubes 94 a preselected distance, namely 8 inches in the case of the preferred apparatus of the present invention. In a single revolution of motor 82, each of the cam followers 86 and 88 engage respective camming grooves 182 and 184 through a 180° arc, providing a dwell time for longitudinal transfer plate 90 and transfer tubes 94 in the next successive 180° arc segments of the single revolution of motor 82. To return transfer tubes 94 to their starting positions, motor 82 is rotated a single revolution in the opposite direction.

During the dwell time between two forward movements of longitudinal transfer plate 90, i.e., after cam follower 86 has moved the transfer assembly forward and before cam follower 88 has engaged to effect the second stage of the forward movement of the assembly, piston 100 is actuated and operates through crank arm 104, shaft 98 and disc 188 through pivotally connecting pusher elements 190 and 192, to push oppositely directed crank arms 194 and thereby to rotate, in opposite directions, transfer tubes 94. At a connecting point 200, each of the transfer tubes 94 is divided and mated by a male T-shaped section 202 and a corresponding female receiving groove 204. As seen in FIG. 16, the corresponding female receiving groove 204 permits limited angular movement between the two halves of transfer tubes 94 joined thereby. More specifically, receiving groove 204 is adapted to permit limited rotational movement of the rearward sections of transfer tubes 94 without corresponding angular movement being imparted to the forward sections of transfer tube 94. In this manner, when the second stage of the transfer movement of transfer tubes 94 from left to right in these drawings is effected by cam follower 86, the right hand sections of transfer tubes 94 have been rotated upwardly so that dogs 152 are disengaged from the chuck bars at their respective container stations. In this manner, movement of containers at the more widely spaced stations is effected by the second stage of the longitudinal movement of transfer tubes 94 while those containers at the more closely spaced stations are not moved. In order to effect return of transfer tubes 94 to their starting positions, cams 206 are attached to the left hand sections of transfer tubes 94. Cams 206 ride on tracks 208 during the transfer movement of transfer tubes 94 and at the conclusion of the second stage of this movement engage cam receiving member 201 which is then moved downwardly by pistons 212 to return the two lengthwise halves of each of the transfer tubes 94 to the same angular position. The return movement of transfer tubes 94 by cam followers 86 and 88 is then effected, as previously described, and the transfer mechanism is ready for the next cycle.

The process of the present invention, the process involved in the operation of the apparatus of the invention, and the operation of the apparatus of this invention, particularly with reference to the preferred embodiment thereof shown in FIGS. 1-16 will now be described.

While this process and apparatus may be adapted to any of a wide range of thermoplastic fluid bed coating powders, the preferred conditions described herein have been selected with a view to producing a durable, high quality and very clear, thin (on the order of 3 mils) and uniform (in the range from 2 to 5 mils) coating from a resin of the metal terminated polyethylene type, particularly such resins commercially known as ionomers, and most specifically that resin available from the E. I. DuPont de Nemours Corporation, of Wilmington, Del., under the trade designation "Surlyn". "Surlyn" Ad 5001 ionomer powder is one such DuPont product useful in the present invention. A fluidizing agent, such as a fine grained silica (of the type available under the trade names "Aerosil" or "Tillanox") may also be included in the fluid bed powder. Air, at a pressure of from 1 to 4 pounds per square inch, is introduced through a porous plate forming the bottom of the fluidized bed tank, in a volumetric flow rate, dependent upon the dimensions of the tank, sufficient to fluidize the bed to produce a fluidized bed of a height on the order of 12 to 24 inches. Clean, dry air at a temperature below 100° F is required for this purpose. Although the details of the fluidized bed tank are not illustrated herein, generally, the tank may include an overflow trough or outer tank with a slight space between the inner and outer tank to serve as an overflow trough for collecting excess powder. A vacuum may be pulled through this trough to prevent loss of powder to and contamination of the surrounding air space.

An important feature of the process of the present invention and of the operation of the apparatus of the present invention is the careful thermal conditioning of the containers before coating and after coating. In particular, a critical factor in the fluid bed coating of glass containers has been found to be the lack of uniformity of surface temperature and thermal characteristics of various containers in a row of containers and even on different parts of the same container. The present invention therefore requires a thermal conditioning chamber prior to the immersion of the containers to be coated in the fluid bed coating material. This may be accomplished by a relatively long dwell time in the thermal conditioning preheat oven 4. Preferably, however, containers already preheated to a higher temperature, such as those passing through a post-production annealing oven or a decoration conditioning lehr are passed directly from such annealing ovens or lehrs at a temperature just below that necessary for fluid bed coating in the process and apparatus of the present invention. The containers are then reheated through a relatively small temperature increment, on the order of 20° – 40° F in thermal conditioning oven 4.

In this manner, a high degree of temperature uniformity and heat transfer characteristics are obtained throughout the containers to be coated. Generally, the uniform surface temperature of the containers just prior to coating is on the order of 425° – 450° F for purposes of coating with "Surlyn" AD 5001 thermoplastic fluid bed coating powder produced by DuPont. This uniform temperature of containers emerging from thermal conditioning oven 4 may be obtained by conditioning cool containers to be coated for an extended period of time, on the order of 10 minutes or more. Preferably, however, containers to be coated are then permitted to cool to about 375° – 400° F in the annealing or decorating lehr and then reheated in thermal conditioning oven 4 to a temperature on the order of 425° – 450° F.

As such thermally preconditioned containers reach the right hand end of lehr 2 motor 8 is actuated, by a photosensitive detector for example, in turn lowering lift arms 20 and chuck bar 38 suspended therefrom. Piston 32 is then actuated, and by the reverse movement of chuck bar 38 and slideable bar 128, together with the actuation of retainer bar 114, causes each of the containers to be engaged between container neck supports 112 and container neck backing members 132 as chuck necks 110 are lowered over the necks of containers 6. Lift arms 20, with containers 6 now suspended therefrom engaged in container neck supports 112 and chuck necks 110, are lifted to the height of transfer rail 44 while piston 32 is returned to its starting positions and chuck bar 38 is ready for transfer by the movement of transfer tubes 94 and dogs 152 thereon to dipping station bar support 56. Piston 60 is then actuated to lower containers 6 into fluid bed coating tank 58, where the containers are immersed for a period of time on the order of 1½ seconds and preferably about 2 seconds. Reverse actuation of piston 60 then raises containers 6 back to the transfer level and from dipping station bar support 56, transfer tubes 94 and dogs 152 then transfer bar support 38 with containers 6 suspended therefrom to thermal conditioning oven 74.

Transfer of the containers along the length of the machine is accomplished in each case by the counter-rotational movement of transfer tubes 94 with dogs 154 actuating pivotally mounted locking members 152, disengaging the lower tip thereof from openings 153 in channel 150. Actuation of motor 82 through a single revolution then causes transfer tubes 94 with chuck bars 38 and chucks and containers suspended therefrom to be moved the distance between adjacent stations, as previously described. Chuck bars transferred to dipping station bar support 56 engage the sloped surfaces 180 of member 176 forcing that member inwardly against the pressure of spring means 178, thereby opening passageway 170 and permitting pressurized air to flow into the hollow central section of chuck bar 38 and thence down over the necks of the containers to be coated. In this manner, intrusion of fluid bed coating powder into the internal space of the containers themselves is positively precluded.

Again to assure fusion of coating and maximum clarity, the coated containers are conditioned for a minimum of 2 minutes in thermal conditioning oven 74 at a temperature above the melting point of the coating powder. In the case of Surlyn AD 5001, the temperature in thermal conditioning oven 74 is in the range of 425°–450° F, preferably about 450° F. From thermal conditioning oven 74, containers are passed through various conditioning stations to an air cooling section 76. In chamber 78, the containers are spray quenched with water in order to cool the film very rapidly thereby preventing crystallization. (When a container cools slowly, the film crystallizes and this results in a cloudy appearance.) Just prior to the removal of containers at station 80, containers 6 are passed over a table support and removed from chuck bar 38 by first moving container neck supports 112 upwardly and then camming retainer bar 114 back to the retaining position. Neck supports 112 are then lowered and the containers are retained on the lower table support from which they may be withdrawn and packaged. Chuck bar 38 is then removed and returned to the first transfer station at the left of the machine as illustrated.

In accordance with the foregoing, a high quality, thin, uniform and very clear thermoplastic coating is applied to bottles in accordance with the present invention.

While the present invention has been described with respect to specific conditions and apparatus, it should be understood that the present invention is not limited thereto and that various minor features of the process and apparatus may be omitted or modified without departing from the present invention in its true spirit or scope. The appended claims are intended therefore to cover all such equivalent variations of this invention, notwithstanding such minor omissions or modifications.

We claim:

1. Bottle holding chuck including
   1. a horizontally disposed U-shaped member adapted to support a bottle resting thereon at a generally horizontal surface feature on the outer surface near the top of said bottle and
   2. a cap member adapted to fit loosely over the top of said bottle to prevent horizontal movement thereof said horizontally disposed member and said cap member being cooperatively arranged and adapted to carry a bottle positively positioned thereon and suspended therefrom with substantially all of said bottle below said surface feature free of contact with any part of said chuck.

2. Bottle holding chuck, as recited in claim 1, wherein said cap member is closed at the top thereof to prevent the introduction of foreign materials into the interior of said bottle while said bottle is held on said chuck.

3. Bottle holding chuck, as recited in claim 1, wherein said cap member includes means for introducing pressurized gas into the interior thereof.

4. Bottle holding chuck, as recited in claim 1, wherein said cap member is vertically movable within a chuck support member.

5. Bottle holding chuck, as recited in claim 4, wherein said cap member includes an upwardly extending section with a notch therein adapted to receive a horizontally disposed member adapted to retain said cap member in its raised position, said cap member being free to drop downward upon horizontal movement of said horizontally disposed retainer member and disengagement of said member and said notch.

6. Bottle holding chuck, as recited in claim 5, wherein said cap member is urged downwardly.

7. Bottle holding chuck, as recited in claim 4, wherein a plurality of said chucks, including chuck support members, are mounted at spaced positions on a chuck bar adapted to engage bottles by a first horizontal movement of said bar and chucks toward said bottles and the open end of said U-shaped members with said cap members in the raised positions thereof, and then by a second vertically downward movement of said cap member over said bottles.

8. Bottle pick-up means including bottle holding chucks and chuck bar, as recited in claim 7, and further including a second bar at a bottle pick-up position, said second bar disposed parallel to said chuck bar, with bottle neck supports suspended from said second bar at spaced positions directly opposite the open ends of said chuck U-shaped members, said second bar adapted to remain at said bottle pick-up position and said chuck bar comprising one of a plurality of such chuck bars each adapted to be transferred to and away from said pick-up station.

9. Bottle pick-up means, as recited in claim 8, including chuck engaging means for simultaneously moving said second bar with said bottle neck supports and said chuck bar at said bottle pick-up position with said chuck U-shaped members toward one another to engage bottles' necks therebetween, means for then causing said cap members to drop over said bottles' necks and means for then causing said neck supports and U-shaped members to return to their starting positions.

10. Bottle pick-up means, as recited in claim 9, wherein said chuck engaging means includes a first rack cammed by said chuck bar at said bottle pick-up position to move in unison therewith during the first movement thereof, a second rack associated with said second bar, a gear engaging both of said racks to cause simultaneous movement thereof in opposite directions.

11. Bottle pick-up means, as recited in claim 10, further including means for returning said gear and said racks to the starting positions thereof.

12. Bottle pick-up means, as recited in claim 9, wherein said caps are held in their raised positions by a horizontally disposed retainer member engaging slots in upwardly extended portions of each of said cap members, an end of said retainer member extending from said chuck bar and adapted to engage a camming member near the limit of the bottle engaging oppositely directed movement of said chuck bar and said second bar, said camming member causing said retainer member to disengage from said chuck cap member.

13. Bottle holding means including a chuck bar and bottle holding chucks, as recited in claim 7, said chuck bar including end members with rollers adapted to rest on support members with said chuck bar suspended between said support members.

14. Bottle holding means, as recited in claim 13, said end members further including transfer engaging means adapted to receive pushing means for transferring said bottle holding means along said support means.

15. Bottle transfer means including bottle holding means, as recited in claim 14, combined with pusher means consisting of a pair of elongated pusher members with pusher dogs on each pusher member extending substantially away from said member and toward the other member of said pair, at spaced positions along the length thereof, locking-unlocking means for reciprocably rotating said elongated members about the axes thereof to effect engagement and disengagement of said pusher dogs in said end members, transfer means for reciprocably moving said elongated members longitudinally to effect transfer of said bottle holding means along said support member.

16. Bottle transfer means, as recited in claim 15, wherein said end members include a pivotally mounted locking member spring biased to engage lock member receiving means spaced at pre-selected positions along said support member corresponding to the spaced positions of said pusher dogs on said elongated pusher members, said locking members being adapted to be cammed into non-locking position by engagement of said pusher dogs in said end members.

17. Bottle transfer means, as recited in claim 15, wherein said elongated pusher members are cylindrical or tubular and rest on roller bearing members to facilitate rotational and longitudinal movement thereof.

18. Bottle transfer means, as recited in claim 15, wherein each of said elongated pusher members consists of at least two lengthwise sections jointed together by mating male and female T-shaped thrust transmitting projections with clearance to permit radial movement therebetween through a limited arc.

19. Bottle transfer means, as recited in claim 18, wherein said locking-unlocking means and said thrust transmitting T-shaped projections are adapted to cause said lengthwise sections to be rotated in unison in locking said dogs in said end sections while permitting said sections to be rotated independent of one another in the reverse or unlocking rotational movement.

20. Bottle transfer means, as recited in claim 19, wherein said locking-unlocking means includes sequencing means to rotate at least one pair of sections of said elongated pusher members to the unlocked rotational position while said pusher members are in a lengthwise transfer position intermediate their limits of longitudinal travel, said locking-unlocking means including further means to rotate the remaining pairs of sections of said elongated pusher members to the unlocked positions thereof as the elongated pusher members reach the limit of their longitudinal travel at the lengthwise transfer ending positions, said sequencing means also causing said locking-unlocking means to cause all of said elongated pusher members to be rotated into the locked, end member engaging position upon return of the elongated pusher members to the lengthwise transfer starting position.

21. Apparatus for applying a thermoplastic coating to glass bottles including:
   a. bottle pick-up means, as recited in claim 9, wherein said chuck bar includes end members with means for supporting said end members on a pair of pick-up station transfer track segments, means for moving said pick-up station transfer track segments between a lower pick-up position, at which said bottles are picked up to a higher transfer position from which said bottles are transferable to subsequent processing stations, at which position said pick-up station transfer track segments are aligned with other transfer track segments in said machine,
   b. a first pair of stationary transfer track segments adapted to transfer one of said chuck bars with chucks thereon to said pair of pick-up station transfer track segments,
   c. means for immersing said bottles suspended from said chuck bars, at a pre-selected position following transfer from said pick-up station track segments, in a fluidized bed of thermoplastic coating powder,
   d. a second pair of stationary transfer track segments adapted to receive bottles transferred from said coating station track segments, and
   e. means for transferring said chuck bars along all of said transfer track segments.

22. Apparatus, as recited in claim 21, wherein said pick-up station transfer track moving means comprises a pair of crank arms with said pick-up station transfer track segments pivotally connected to one end thereof.

23. Apparatus, as recited in claim 22, wherein said crank arms include means for maintaining said pick-up station transfer track segments in a horizontal position at all radial positions of said crank arms.

24. Apparatus, as recited in claim 23, wherein said crank arms are adapted to move said pick-up station transfer track segments both horizontally toward subsequent processing stations and vertically to said transfer position.

25. Apparatus, as recited in claim 22, wherein said chuck engaging means includes means for moving said crank arms transversely to effect said chuck bar movement.

26. Apparatus, as recited in claim 26, wherein said chuck engaging means includes means for moving said crank arms transversely to effect said chuck bar movement.

27. Apparatus, as recited in claim 21, further including a pair of coating station transfer track segments with means for raising and lowering same.

28. Apparatus, as recited in claim 25, further including a pair of coating station transfer track segments with means for raising and lowering same.

29. Apparatus, as recited in claim 21, including means for introducing pressurized gas in said chuck caps simultaneously with operation of said bottle immersing means.

30. Apparatus, as recited in claim 21, said chuck bar transfer means comprising a pair of elongated pusher members with pusher dogs on each pusher member extending substantially away from said pusher member and toward the other member of said pair, at spaced positions along the length thereof, locking-unlocking means for reciprocably rotating said elongated members about the axes thereof to effect engagement and disengagement of said pusher dogs in said end members, transfer means for reciprocably moving said elongated members longitudinally to effect transfer of said bottle holding means along said support member.

31. Apparatus, as recited in claim 30, wherein said end members include a pivotally mounted locking member spring biased to engage lock member receiving means spaced at pre-selected positions along said support member corresponding to the spaced positions of said pusher dogs on said elongated pusher members, said locking members being adapted to be cammed into non-locking positions by engagement of said pusher dogs in said end members.

32. Apparatus, as recited in claim 31, wherein:
   a. each of said elongated pusher members consists of at least two lengthwise sections jointed together by mating male and female T-shaped thrust transmitting projections with clearance to permit radial movement therebetween through a limited arc,
   b. said locking-unlocking means and said thrust transmitting T-shaped projections are adapted to cause said lengthwise sections to be rotated in unison in locking said dogs in said end sections while permitting said sections to be rotated independent of one another in the reverse of unlocking rotational movement,
   c. said locking-unlocking means includes sequencing means to rotate at least one pair of sections of said elongated pusher members to the unlocked rotational position while said pusher members are in a lengthwise transfer position intermediate their limits of longitudinal travel, said locking-unlocking means including further means to rotate the remaining pairs of sections of said elongated pusher members to the unlocked positions thereof as the elongated pusher members reach the limit of their longitudinal travel at the lenthwise transfer ending positions, said sequencing means also causing said locking-unlocking means to cause all of said elongated pusher members to be rotated into the locked, end member engaging position upon return of the elongated pusher members to the lengthwise transfer starting position.

33. Apparatus, as recited in claim 21, including a thermal conditioning chamber for treating bottles prior to engagement of said bottles in said pick-up means.

34. Apparatus, as recited in claim 21, including at least one post-conditioning bottle thermal conditioning space, said second pair of stationary transfer track segments passing through said space.

35. In a transport mechanism for articles to be conveyed through one or more pluralities of evenly spaced linearly disposed stations, wherein said articles are retained in a holder having end members adapted to be supported on a pair of transfer tracks running lengthwise along said stations and to be moved along the length thereof, the improvement consisting of a pair of elongated pusher members disposed parallel to said transfer tracks with end member engagement pusher dogs, adapted to engage said end members, at spaced positions along the length of said pusher members corresponding to the positions of said stations, said dogs extending toward the space between said tracks, locking-unlocking means adapted to rotate said elongated pusher members in opposite directions to cause said dogs to engage and disengage said end members, and longitudinal transfer means for moving said pusher members lengthwise, from the starting position thereof, in the direction said articles are intended to be transferred, while said dogs are in the engaged position thereof, and for returning said pusher members from their end transfer position to their starting position while said dogs are in the disengaged position thereof.

36. An improved transport mechanism, as recited in claim 35, wherein said end members include means for locking said end members at pre-selected positions along said track while said transfer member dogs are disengaged from said end members.

37. An improved transport mechanism, as recited in claim 35, wherein said pair of elongated pusher members is divided into at least two pairs of member segments, adjoining segments being connected by a thrust transmitting joint of mating male and female T-shaped projections, said projections adapted to permit relative angular movement of ssaid adjoining segment through a limited arc and to prevent relative angular movement beyond said arc, said locking-unlocking means being adapted to rotate all of said segments simultaneously to engage said dogs in said end members and to counter-rotate said adjoining segments independently to disengage said dogs on each pair of pusher member segments from said end members at a pre-selected time relative to the longitudinal transfer of said pusher members.

* * * * *